United States Patent [19]
Kalish et al.

[11] Patent Number: 5,553,259
[45] Date of Patent: Sep. 3, 1996

[54] APPARATUS AND METHOD FOR SYNCHRONIZING THE SIMULTANEOUS LOADING OF CACHE PROGRAM WORD ADDRESSES IN DUAL SLICE REGISTERS

[75] Inventors: David M. Kalish, Laguna Niguel; Saul Barajas, Mission Viejo; Paul B. Ricci, Laguna Niguel, all of Calif.

[73] Assignee: Unisys Corporation, Blue Bell, Pa.

[21] Appl. No.: 547,577

[22] Filed: Oct. 24, 1995

Related U.S. Application Data

[63] Continuation of Ser. No. 93,429, Jul. 16, 1993, abandoned.

[51] Int. Cl.$^6$ .................................................. G06F 12/08
[52] U.S. Cl. ......................... 395/403; 395/454; 395/495; 364/DIG. 1; 364/243.44; 364/247.2
[58] Field of Search .................................. 395/403, 454, 395/421.09, 495

[56] References Cited

U.S. PATENT DOCUMENTS

| | | | |
|---|---|---|---|
| 3,895,357 | 7/1975 | Schwartz et al. | 395/775 |
| 3,909,797 | 9/1975 | Goss et al. | 395/375 |
| 4,084,229 | 4/1978 | Taylor et al. | 395/375 |
| 4,488,227 | 12/1984 | Min et al. | 395/375 |
| 4,724,518 | 2/1988 | Steps | 395/425 |
| 4,736,293 | 4/1988 | Patrick | 395/425 |
| 5,121,354 | 6/1992 | Mandalia | 365/189.02 |
| 5,121,480 | 6/1992 | Bonke et al. | 395/250 |
| 5,175,701 | 12/1992 | Newman et al. | 364/723 |
| 5,295,229 | 3/1994 | Viot et al. | 395/51 |
| 5,333,280 | 7/1994 | Ishikawa et al. | 395/375 |

*Primary Examiner*—Matthew M. Kim
*Attorney, Agent, or Firm*—Alfred W. Kozak; Mark T. Starr; Steven R. Petersen

[57] ABSTRACT

A method and implementation is supplied for the synchronous loading and integrity checking of registers located in two different integrated circuit chips. Thus in a computer system having cache memory where the cache memory is sliced into two portions, one of which holds even addresses and the other of which holds odd addresses, there is provided two individual chips each of which has a program word address register which is loaded at the exact same period of time and which is additionally incremented in both cases at the exact same period of time. Further means are provided for checking the integrity of the program word address registers in the first slice and the second slice of the cache in order to insure that they are coherent, or if not coherent, then a disable signal will prevent usage of the address data involved.

5 Claims, 10 Drawing Sheets

\* PWAR = PROGRAM WORD
    ADDRESS REGISTER
  INCR = INCREMENT
  INC = INCREMENT

MULTIPLE PROCESSOR-DUAL BUS COMPUTER SYSTEM

* PWAR=PROGRAM WORD ADDRESS REGISTER

FIG. 12A COMPARISON DONE INSIDE CHIP SLICES

* PWAR=PROGRAM WORD ADDRESS REGISTER
PTY=PARITY

FIG. 12B COMPARISON DONE IN AN EXTERNAL DEVICE

APPARATUS AND METHOD FOR SYNCHRONIZING THE SIMULTANEOUS LOADING OF CACHE PROGRAM WORD ADDRESSES IN DUAL SLICE REGISTERS

This is a continuation of application Ser. No. 08/093,429 filed Jul. 16, 1993, now abandoned.

FIELD OF THE INVENTION

This disclosure involves the synchronization and coherency in the loading of separate registers located in different chip slices in a computer system where, for example, one register resides in the processor logic and the other register resides in the cache memory.

CROSS REFERENCES TO RELATED INVENTIONS

This application is related to other co-pending applications which involve aspects of computer systems and these include:

Co-pending U.S. application U.S. Ser. No. 08/056,324 entitled "Programmable Multi-Purpose Virtual Pin Multiplier System".

Co-pending U.S. application U.S. Ser. No. 08/093,428 entitled "Cache Invalidation Sequence System".

BACKGROUND OF THE INVENTION

Figure 6:
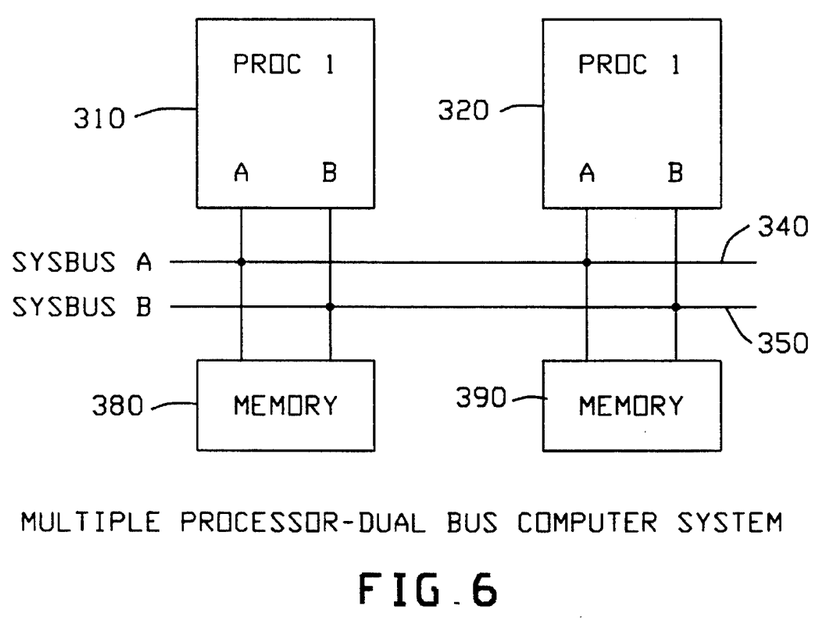
FIG. 6 shows general architecture of a computer system using a processor and memory connected by system busses.

In the operation of the standard computer system, a processor is used to execute a series of instructions known as the program and these instructions are generally stored in a main memory. Additionally, the processor performs various mathematical calculations with the data which it retrieves from and which it stores in main memory, wherein the main memory is generally placed on a separate circuit board in the system. FIG. 6 shows a generalized form of a typical architecture of a computer system having processor cards and memory cards which are linked by one or more system busses. Thus, both the first processor 310 and the second processor 320, connect to a pair of system busses, system bus A 340 and system bus B 350 which busses also connect to the main memory modules 380 and 390.

Normally, the accessing of main memory is relatively slow compared to the time it takes for the processor to execute an instruction. The processor must generally wait for the completion of either a memory Read or a memory Write operation and thus no other useful work can be done while the processor is sitting there waiting. It is advantageous in such systems to have a cache memory which can store a subset of the data normally found in the main memory whereby the cache can provide data access, via Read and Write operations, much faster for the processor than the main memory can. This is the case since the following conditions are generally present:

(1) The cache memory is small enough to be placed on the same circuit board as the processor and with the shorter distance that the signal has to travel, the faster the signal can get to its destination.

(2) The cache memories use faster memory chips. Generally it would too expensive to implement the entire main memory of the system with the fastest available RAMs, but since the cache is relatively small, it is possible to make the cost feasible for usage.

Figure 7:
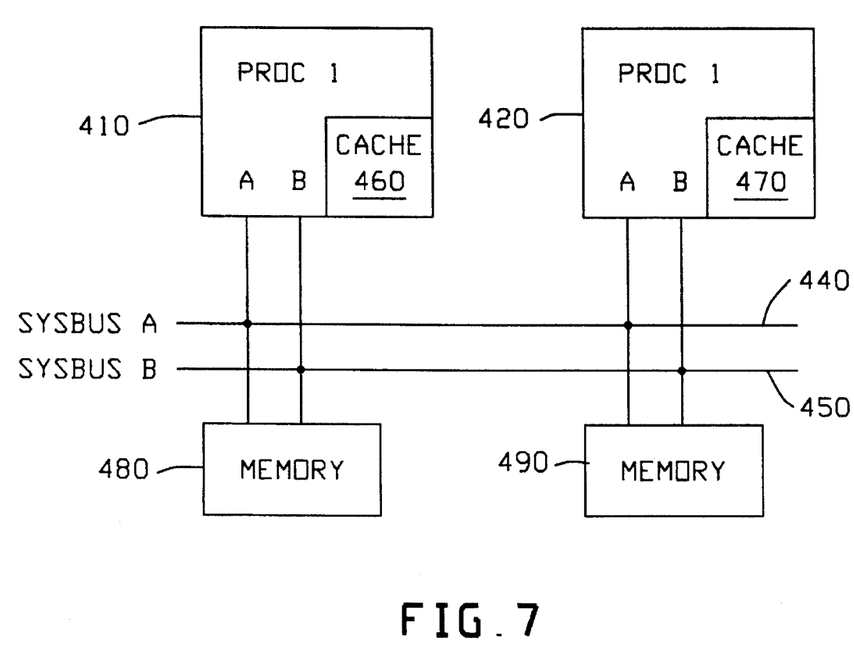
FIG. 7 is a block diagram of computer architecture wherein cache memory is added to the processor architecture.

FIG. 7 indicates the modified architecture of a computer system which includes the implementation of a cache memory. Thus, a first processor 410 has a cache 460, a second processor 420 has a cache 470, and the dual system busses 440 and 450 connect to the main memory modules 480 and 490.

Even though a cache memory can be on the order of 1/1000th the size of a main memory, it still relies on the situation that data words and program words are repeatedly accessed after they have been used for the first time by the processor. Thus, by keeping the most recently used words in the cache memory, the processor would have direct access to the cache and would only have to access main memory a small percentage of the time, possibly only the order of 5% of the time. The remaining 95% of the time, the data could be found in the cache memory. This percentage is commonly known as the "hit ratio" of the cache. Now if the processor can save a few clock cycles with every cache "hit", it can readily be understood that the performance of the system will be generally increased.

An example of the use of a processor chip in a system is that typically used in the Unisys computer system designated as the A11–411 which uses a processor chip designated as the "IMP" (Integrated Mainframe Processor). This IMP processor chip contains a "code buffer" that can store two code words which the processor may need to execute in the next few moments of time. When one of these code words is taken from the code buffer by the processor, then a FETCHCODE signal is generated so that then a new code word can be fetched and placed into the newly vacated code buffer location. The FETCHCODE is to quickly get the next codeword in a sequence, as for example, addresses 100 and 101. The READCODE is needed for a branch operation when the next code word is not the address immediately after the previous code word, for example, addresses 100 and 200.

Since the computer program is usually executed in a sequential order according to consecutive memory locations, an incrementation register is often used to generate the FETCHCODE addresses and this register would generally be incremented after every code fetch.

If there is a branch to another area of the program material, the incrementation register (often called Program Word Address Register, PWAR) will be loaded with the new address and will then be incremented from that point onward. The re-loading of this "program word address register" (PWAR) occurs during an operation called the READCODE operation. After the READCODE operation is completed, the register (PWAR) is "incremented" so that it holds the value of the potential "next address" in the code sequence.

The register designated as the Program Word Address Register (PWAR) resides in the processor logic. However, another copy of this PWAR register is also found in the cache memory in order that the processor does not have to send a comparable address to the cache memory when a code buffer location in the processor logic is empty. The processor merely sends a FETCHCODE signal to the cache memory and then the cache memory will use its own duplicate program word address register (PWAR) to determine the address from which the next used code will be fetched.

Figure 8:
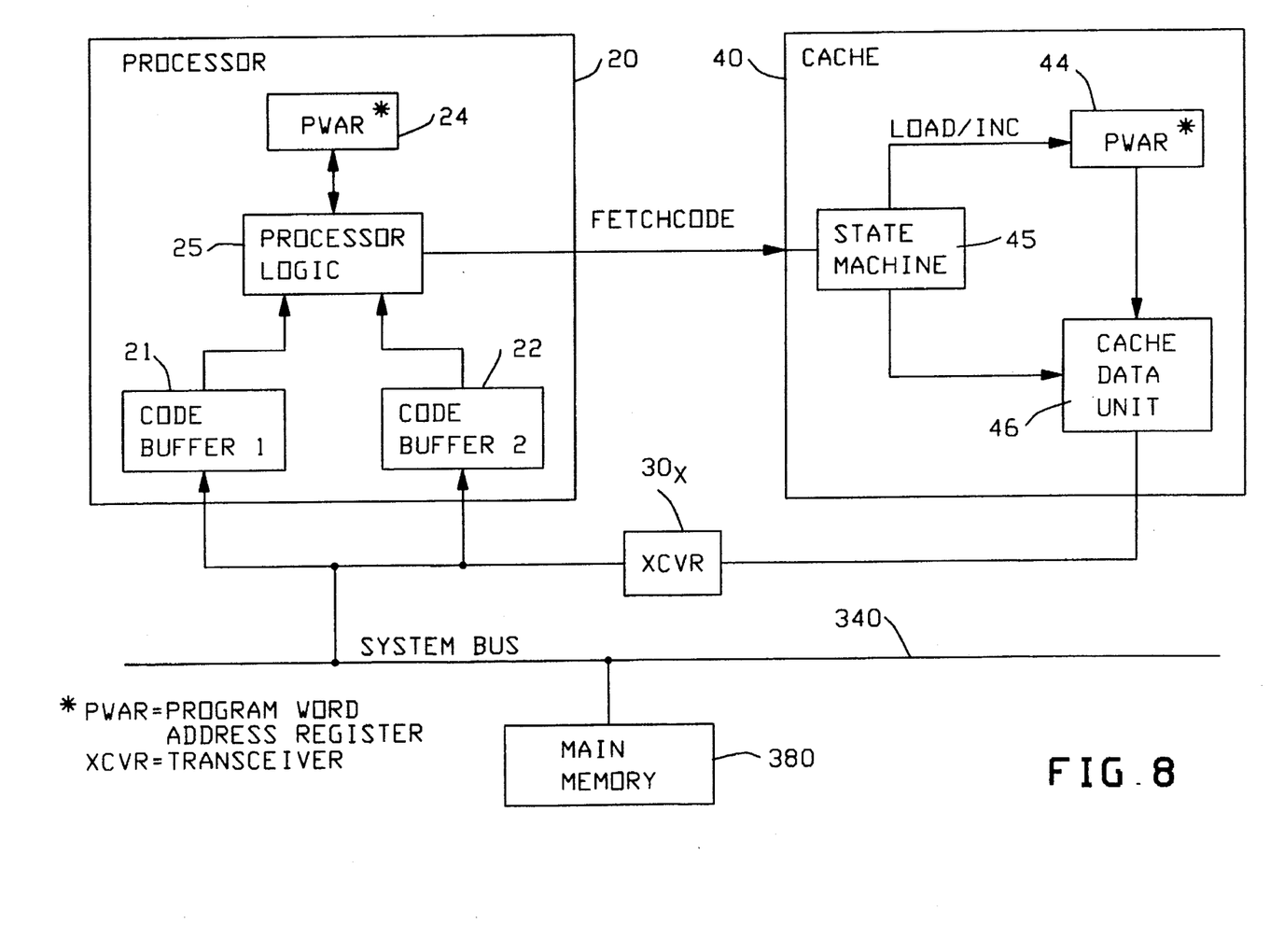
FIG. 8 is a block diagram showing a central processing module having a processor unit chip and cache memory unit chip each having their own comparable programmable word address registers.

This type of arrangement is shown in FIG. 8. As seen in FIG. 8, a computer system involving a processor 20 with its cache unit 40 operates over a system bus 340 to the main memory 380. The data words in the cache data unit 46 are transferred on the line through transceiver 30$_x$ over to the code buffers 21 and 22 for use of the processor logic 25. The processor logic 25 has a program word address register 24.

Likewise, the cache memory 40 has a program word address register 44 which is loaded and incremented by the state machine 45 which also provides an input to the cache data queue 46.

Typically here, a branch in code execution would result in a READCODE operation and the next group of code data accesses would be to consecutive "memory locations" which would then result in several FETCHCODE operations.

Figure 9:
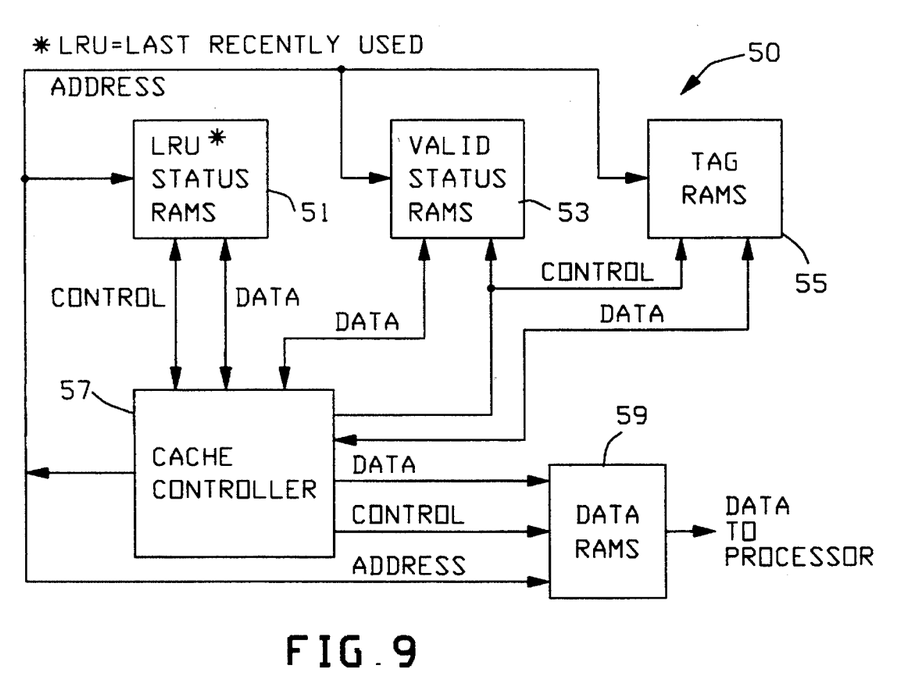
FIG. 9 is a block diagram of a typical cache memory module architecture.

As seen in FIG. 9, a typical cache architecture consists of a cache controller 57 and several RAM memories that store cache data. Thus there is a memory 51 for the last recently used status data (RAM), a memory 53 for valid status memory locations, a memory section 55 designated as tag RAMs and the data RAMs 59 which hold the actual code words involved in many recently used program words.

For better system performance and improvements in reliability, a cache memory module may be divided up into "slices", each of which contains its own cache controller, such as 57 and its own RAM memories such as 51, 53, 55, and 59.

Figure 10:
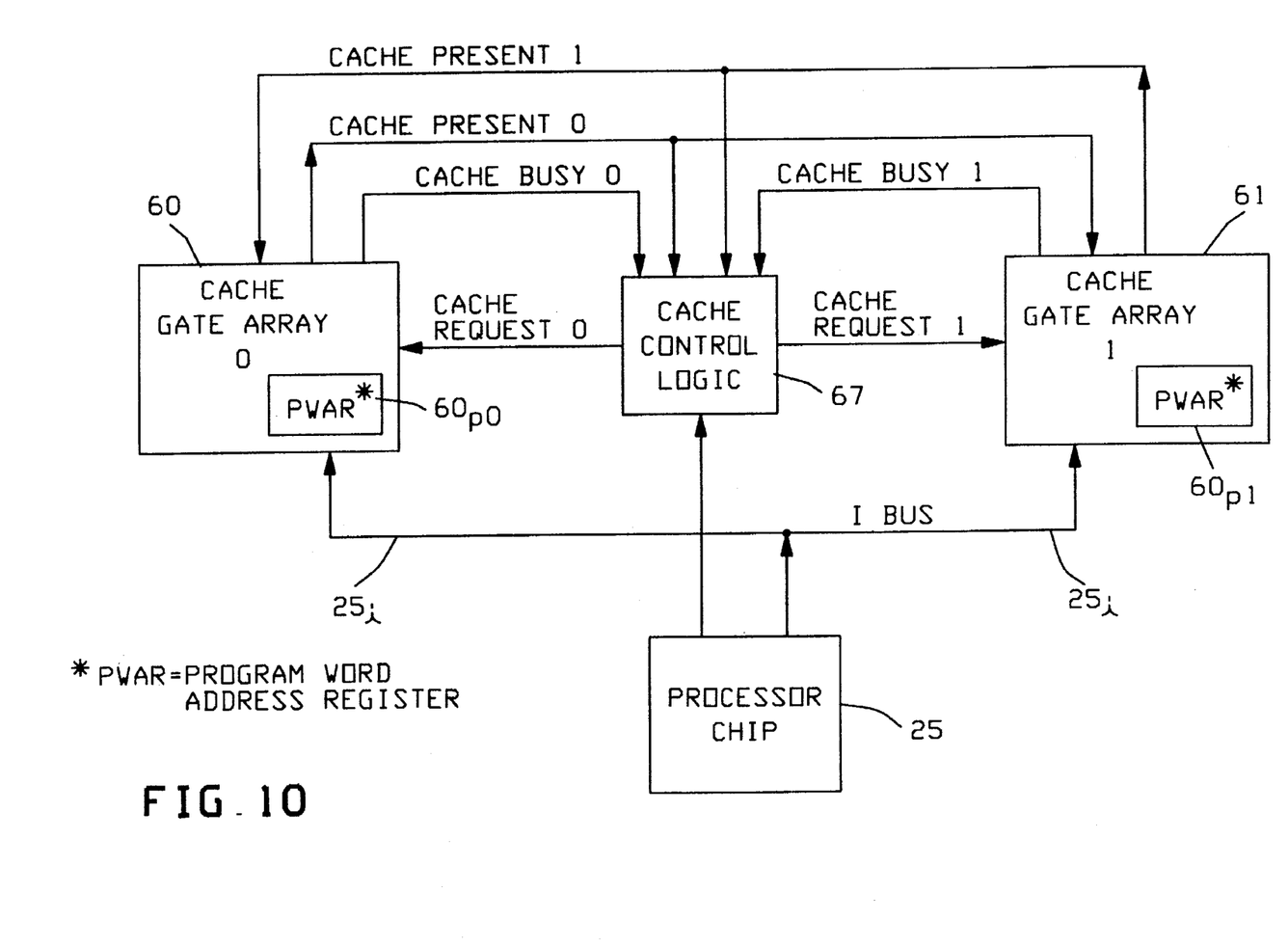
FIG. 10 is a diagram showing how two separate cache memory slices are utilized, one for odd addresses and one for even addresses.

In the aforementioned A11–411 computer system, two cache slices are utilized, one of which handles only odd addresses while the other cache slice handles only even addresses. FIG. 10 is an architectural illustration of how the various resources are divided between the two cache slices and these cache slices are implemented inside two identical Very Large Scale Integrated (VLSI) custom-built gate arrays 60, 61. In this architectural situation, it is important that the chips be identical due to the more expensive cost involved in designing and manufacturing slightly different VLSI chips. Thus, in the cache memory module of FIG. 10, the cache is split into two slices shown as the cache gate array "0" item 60, and the cache gate array "1" item 61, both of which are connected to and under the control of the cache control logic 67. The processor chip 25 communicates through the I bus $25_i$ to the cache slices "0" and "1". The cache control logic 67 can make a cache request to the slice "0" and/or the slice "1". Each of the two slices can provide a busy signal to the cache control logic 67. Also, each of the cache gate arrays "0" and "1" can inform each other of their presence through interconnecting signal lines.

Since both of the cache slices 60 and 61 execute READ-CODE and FETCHCODE commands from the processor 25, there are copies of the program word address register (PWAR) existing in both slices, i.e., there is one PWAR $60_{po}$ in the cache slice 60 and one PWAR $60_{p1}$ in the cache slice 61. Communication must exist between the two slices to make sure that each of their copies of the program word address, in each of the registers, will always agree with each other. However, since the two slices 60 and 61 handle mutually exclusive addresses (odd and even), then only one slice can execute a request from the processor at any given time. The "active" slice is determined by the address of the operation being executed.

If the address is "even" then slice "0", item 60, will execute the operation. If the address is "odd" then slice "1", item 61, will be activated. The "non-active" slice will not do work except for making sure that its personal private program word address register stays synchronized and coherent with that of the PWAR in the active slice. Thus, in FIG. 10, the registers $60_{po}$ and $60_{p1}$ must be loaded at the same moment of time and must be accurate duplicates of each other, that is to say "coherent".

SUMMARY OF THE INVENTION

The present disclosure involves methods and architecture for intercommunications between two separate chip modules in order to insure that the address values in each of the program word address registers (PWAR) are synchronized in time for loading and are accurate duplicates of each other in address content at all times.

A first gate array cache chip holds a programmable word address register and communicates with a second cache gate array chip also having a program word address register.

It is necessary in processor-cache memory operations that after the processor specifies an address in the cache module, it is then necessary for the cache module to return data specified by that address and also to increment the address register (PWAR) to the next sequential address. Now when the cache module is split into two separate chip sections, one for even addresses and one for odd addresses, it is necessary that the programmable word address registers in each of these chip sections track each other exactly in time and duplicate each other in content so that when the next incrementation signal occurs, the address in the alternate cache slice chip will be properly incremented to the next sequential address to be available for the processor. The processor generates a cache request simultaneously to both cache slice chips, that is to say the odd address and the even address chips. However only one address of the two chip slices is selected, alternately. A state machine and gating circuitry insures that each of the programmable word address registers in the first cache slice module and the second cache slice module will duplicate each other and when incremented will also duplicate each other in order to maintain load synchronization of address value.

Additional parity checking structure is provided in order to check that the address value in the first cache slice chip is an exact duplicate of the address value in the second cache slice chip. Thus the odd and the even cache chip modules will have their own respective address registers (PWAR) always tracking each other in synchronism and when incremented will also track each other properly so that the processor can easily access the next data word signified by the incremented address.

DESCRIPTION OF PREFERRED EMBODIMENT

The architectural arrangement disclosed herein can be used for any pair of registers which are implemented in programmable chips such as programmable array logic units or PALs. Specifically, in the aforementioned A11–411 cache design, the programmable word address registers PWAR, are located inside two separate VLSI custom gate array chips. The first problem to consider in regard to two separate registers located in different chip slices, is that of synchronizing the loading of the two registers so that the address data placed therein will be placed there during the same time period such that there is no time lag between their placement. In a typical cache memory design, the processor will send an address of the data word that it needs to the cache memory, along with a group of coded bits that tells of the particular type of operation that the processor wishes to perform. Further, the processor sends a CACHE-REQUEST signal that tells the cache module that an operation is taking place. The operation code is sent along the same bus as the address data which is the I bus $25_i$ shown in FIG. 10. The cache module must immediately decode the operation code, and use the address in order to check for a cache "hit", and also latch the address for future use since the address will only remain on the I bus $25_i$ for but one clock cycle.

In the case of a READCODE operation, the address of the code data must be latched into a PWAR register which will then be used for future code operations. It may be noted that in the described cache slice architecture, only one cache slice (60 or 61, FIG. 10) can receive a cache request at a given time, but yet it is still necessary for both slices to maintain the same address value in their PWARs, thus both slices must perform their load operations during the same clock cycle.

As an example of these operations in FIG. 10, if the processor 25 performs a READCODE operation to the address "1000", then the cache request will go to the slice handling the "even" addresses, that is to say slice "0" item 60. This slice will load its PWAR $60_{po}$ with a value of 1000 and then increment it to "1001" after the operation is completed, that is to say, after the data word corresponding to the address 1000 has been sent to the processor 25.

If the processor 25 needs the next code word at location "1001", it will send a FETCHCODE signal to the other slice (slice #1 item 61) since slice #1 handles the "odd" addresses. Thus it will be seen that if slice #1 did not load its PWAR with the address 1000 and then increment it to 1001 at the same time that slice #0 did, then the slice #1, item 61, could not execute the FETCHCODE with the proper address.

However, due to time limitations, there is not enough time for cache slice #0 to decode the READCODE operation and then send a signal to the other cache slice #1 telling slice #1 to load its PWAR register $60_{p1}$. This is so because, by that time, the next rising clock edge needed to load the register $60_{p1}$ will have passed and the address will no longer be available on the I bus $25_i$. Thus a problem arises.

An arrangement to send the entire READCODE address from one slice, such as slice #0, to the other slice, such as slice #1, would require far too many pins on both chips, which are already in short supply.

In order to obviate the problem, an architecture is made, so that each cache slice 60 and 61 are able to "spy" on the other, and if one slice sees that a READCODE operation is being sent to its counterpart slice, then the first slice will also at the same time load its programmable word address register PWAR. Thus, if slice "0" item 60 spies on the I bus $25_i$ and notices that a READCODE operation is being sent to slice #1, item 61, then at the same time the cache gate array slice "0", item 60, will also load its own register PWAR $60_{to}$.

Since the address and the operation code has to be sent to both cache slices 60 and 61 in FIG. 10, basically the only addition that might need to be made is to provide for one extra pin in each slice to provide for the cache request signal of the other slice. Thus, slice 1, chip 61 is made to receive the signal CACHE-REQUEST "0" as well as CACHE-REQUEST "1".

Figure 1:
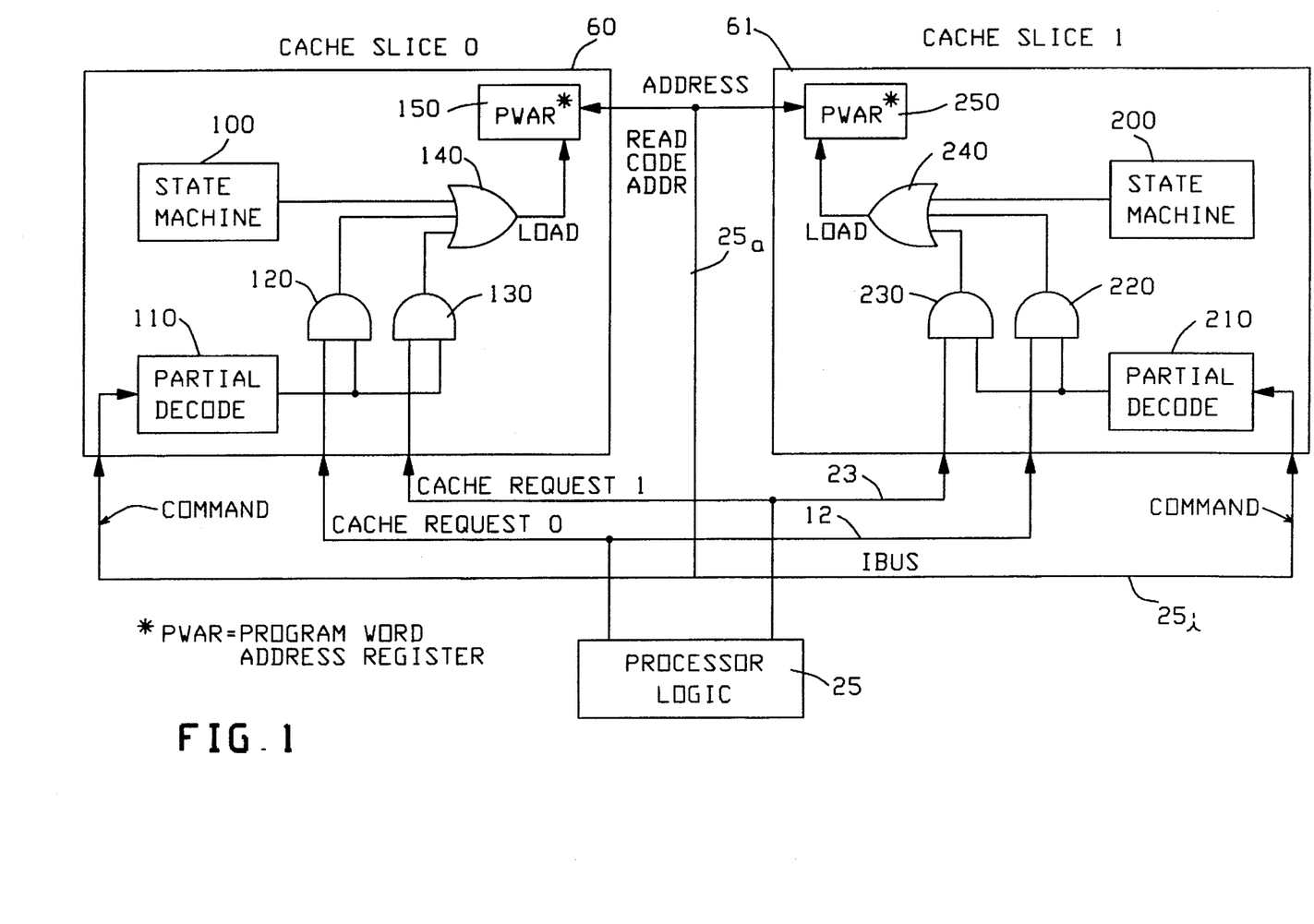
FIG. 1 is a drawing of the architecture of the present invention showing two separate chips each of which provide a slice of cache for respectively odd addresses and even addresses.

The arrangement for doing this in shown in FIG. 1. As seen in FIG. 1, the architecture provides for a cache slice #0 chip 60 and a cache slice #1 chip 61. These slices are on two separate chips. The cache slice module 60 has a PWAR 150, a state machine 100, a partial decoder 110, plus gates 120, 130, and 140.

Likewise the cache slice chip 61 has a PWAR 250, a state machine 200, a partial decoder 210 and gates 220, 230, and 240. As seen in FIG. 1 the processor logic 25 communicates its commands on the I bus $25_i$ to both partial decoder 110 and the partial decoder 210. The processor logic 25 further generates a cache request on line 12 to the cache slice "0" and generates a cache request on line 23 to the cache slice #1. The cache request "0" and cache request "1" signals are fed to AND gates 120 and 130 in chip module 60 and are fed to gates 220 and 230 in chip module 61. The outputs of AND gates 120 and 130 are fed to the OR gate 140 which also receives an input from the state machine 100. Bus 25a of FIG. 1 carries the address f the READCODE from the processor 25.

Likewise in module 61, the OR gate 240 receives the outputs of AND gates 220 and 230 in addition to a signal from the state machine 200 in order to provide a load signal to the register 250.

The output of OR gate 140 in module 60 also provides a load signal to the register 150 in module 60.

Thus in FIG. 1 the additional logic is minimal, for example, there is one gate 130 to decode the operation, plus an extra input to the gate 140 that generates the load signal to the programmable word address register 150.

The next situation that arises is that of synchronizing the "incrementation" of the PWAR registers 150 and 250. After both a READCODE and a FETCHCODE operation, each of the PWAR registers 150 and 250 must be incremented so that they will contain the address of the next-expected code word to be executed.

For READCODE operations, the "inactive" slice can automatically increment its PWAR in one clock after it is loaded, but however, this will result in the two registers (PWAR 150 and 250) being temporarily out of synchronism since the "active" slice must "wait" until the operation is finished before it can increment its PWAR, that is to say for example, the PWAR 150 cannot increment itself until the actual word from the data RAM has been accessed and conveyed to the requesting processor.

This condition of "non-synchronicity" is not a complicated problem except that it makes it considerably more difficult to design logic that can check to see if both of the PWARs are synchronized, that is to say, loaded with the same address at the same time.

Additionally, with the situation of a "FETCHCODE" operation, there are two more pins needed to be added, that is to say, one pin for each slice that allows both FETCHCODE signals to be routed to both slices as was done with the cache request signals on lines 12 and 23 of FIG. 1.

In order to insure that both PWARs 150 and 250 will contain precisely the same address value at all times, this requires adding two more pins to both cache slice chips 60 and 61 in order to allow each cache slice to signal its counterpart when it is about to increment its PWAR. These added pins for each chip are seen in FIG. 2 as $33_p$, $34_p$ and $43_p$, $44_p$.

Thus one signal is sent by cache slice "0" module, chip 60 over to the cache slice "1" module chip 61, when it is in the final stage of a READCODE or a FETCHCODE operation in order that both slices can perform the incrementation at the same time. The other signal required is sent from slice "1" chip 61 over to slice "0" chip 60 in the same fashion.

In contrast to the situation of loading the PWAR, here there is plenty of time to send these signals between the cache slices "0" and "1" since now the cache does not have to wait for a decode signal operation from the processor before sending a signal to the other slice.

Figure 2:
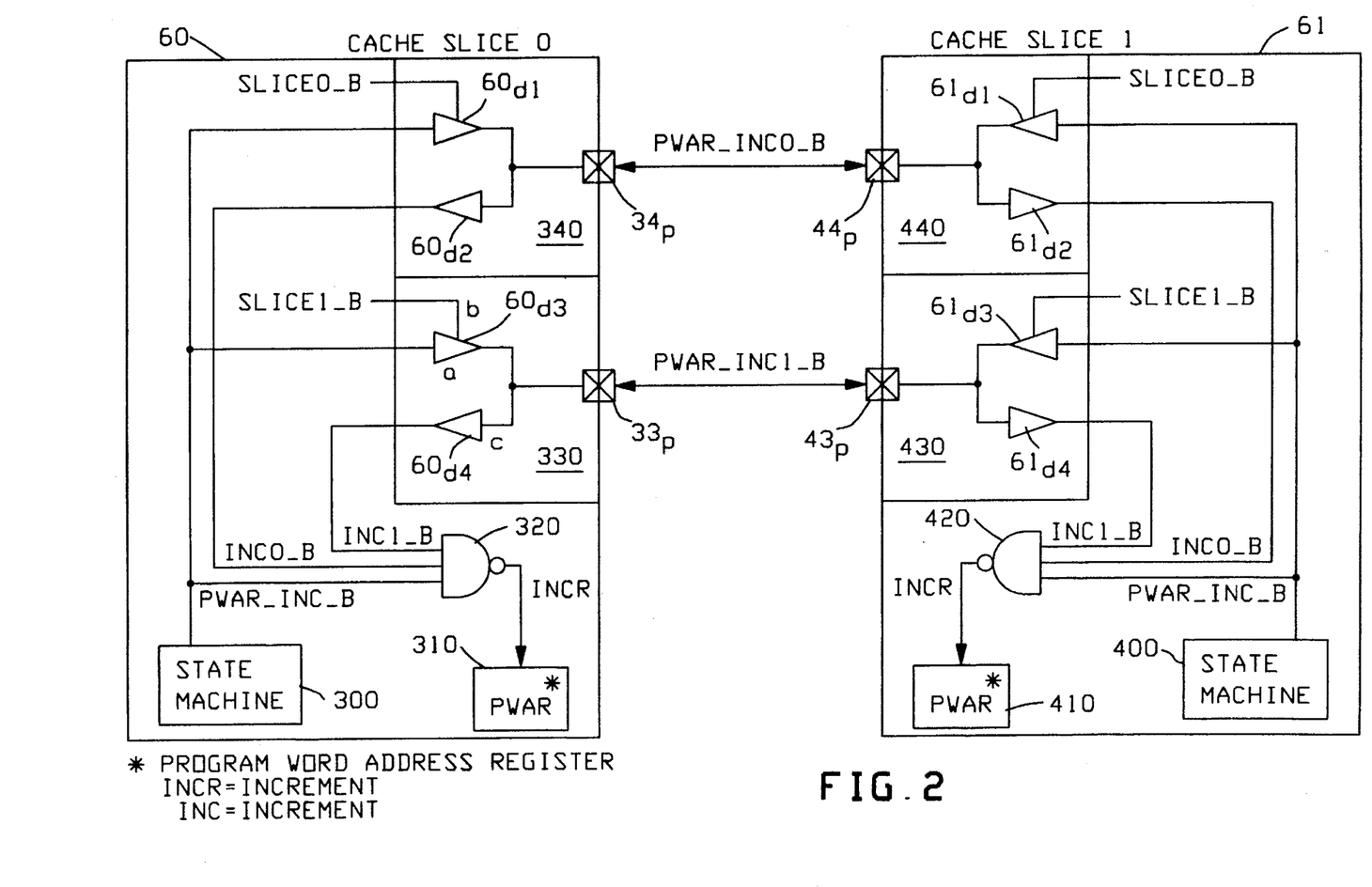
FIG. 2 is a drawing showing how the two cache slice chip modules can intercommunicate using a virtual pin multiplier input/output system.

As illustrated in FIG. 2, the additional logic required is rather minimal and involves just one extra input to the gate (320, 420) that generates the PWAR incrementation signal which is the output of gates 320 and 420 of FIG. 2.

As seen in FIG. 2, one chip 60 manages to operate as cache slice "0" (even addresses) while the other chip module 61 operates as cache slice "1" (odd addresses).

As seen in FIG. 2, the chip module 60 has a programmable word address register 310 which is incremented by the NAND gate 320. A state machine 300 provides inputs to the NAND gate 320 and also to buffer driver's $60_{d1}$ and $60_{d3}$. The driver's $60_{d1}$ and $60_{d3}$ provide respective outputs to the pins $34_p$ and $33_p$ which are called "virtual multiplier pins" as described in a co-pending U.S. patent Ser. No. 08/056,324 entitled "Programmable Multi-Purpose Virtual Pin Multiplier". The return driver's $60_{d2}$ and $60_{d4}$ are fed as inputs to the NAND gate 320, and operate to receive inputs from cache chip 61.

The state machine 300 provides the address register increment signal designated PWAR-INC-B.

Similarly, the cache slice "1" chip module 61 has a programmable word address register 410 which is incremented by the NAND gate 420. The state machine 400 provides an address register "increment" signal to the NAND gate 420 and also to the buffer drivers $61_{d1}$ and $61_{d3}$.

The outputs of these buffer drivers ($61_{d1}$ and $61_{d3}$) connect to pins $44_p$ and $43_p$. The pins $34_p$ and $44_p$, and $33_p$ and $43_p$ operate as dual functioning pins which can provide for input signals or output signals according to the operation of the two respective drivers such as $60_{d1}$ and $61_{d1}$ or $60_{d3}$ and $61_{d3}$ or the two drivers $60_{d2}$, $61_{d2}$ or $60_{d4}$, $61_{d4}$.

The combination of the drivers providing the input and output functions are shown in individual blocks which are indicated as blocks 330, 340, 430, and 440. These blocks 330, 340, 430, and 440 contain all the necessary elements to comprise an input/output pin. For example, observing inside block 330 and focusing on the driver's $60_{d3}$ and $60_{d4}$. The element $60_{d3}$ is the "output driver" which is controlled by a tri-state controller on the line slice 0-B. If the tri-state control slice 0-B is in the "low" state (=to 0) then the signal PWAR-INC-B will be driven by the gate $60_{d3}$ to the pin $33_p$ in an "output" signal mode. It will be noted that this signal also wraps back into the chip via the input buffer driver $60_{d4}$.

If the cache slice "1" in chip module 61 is observed where the SLICE 1-B signal is a "0", this enables the output driver $61_{d3}$ of block 430 to output an increment signal through pin $43_p$ to pin $33_p$. Similarly if the SLICE 1-B signal is a "1", then the block 430 will act only as a receiver and block 330 will be enabled to drive a signal outward from 330 into block 430. Similarly, blocks 340 and 440 work similarly but operate on the control signal designated as SLICE 0-B. The function of blocks 330, 340 and 430, 440 is to enable the "active" chip (60 or 61) to pass its increment signal on to the inactive chip.

An ID (Identification) FF is set during initialization so that if the ID-FF=0, the Slice Ø_B=0 and Slice 1_B=Ø.

Since the Slice Ø_B signal must have opposite values in each of the two slices, this provides that one of the pins ($33_p$, $34_p$ and $43_p$, $44_p$) will be configured to receive. This inter-communication is necessary for the PWARs in both slices to be incremented at the same time.

Several considerations may be made regarding the logic and architecture. If minimizing pin usage is considered a higher priority than minimizing the amount of logic used, then, in the situation of the cache slice design, only one cache slice can execute a request from the processor at a given time. Thus, it is not possible for both chips 60 and 61 to be broadcasting INCREMENT signals to each other at the same time. This is so since the only time this broadcast transmission would take place is in response to a READCODE or a FETCHCODE from the processor. Thus, it is possible to route bi-directional signals between both chips to handle the incrementing function. One signal could not accomplish this if both chip arrays could possibly drive the "increment" signal at the same time since this could "double-drive" the net. Thus two signals are required: one going from Slice Ø to Slice 1, and the other from Slice 1 to Slice Ø.

Figure 3:
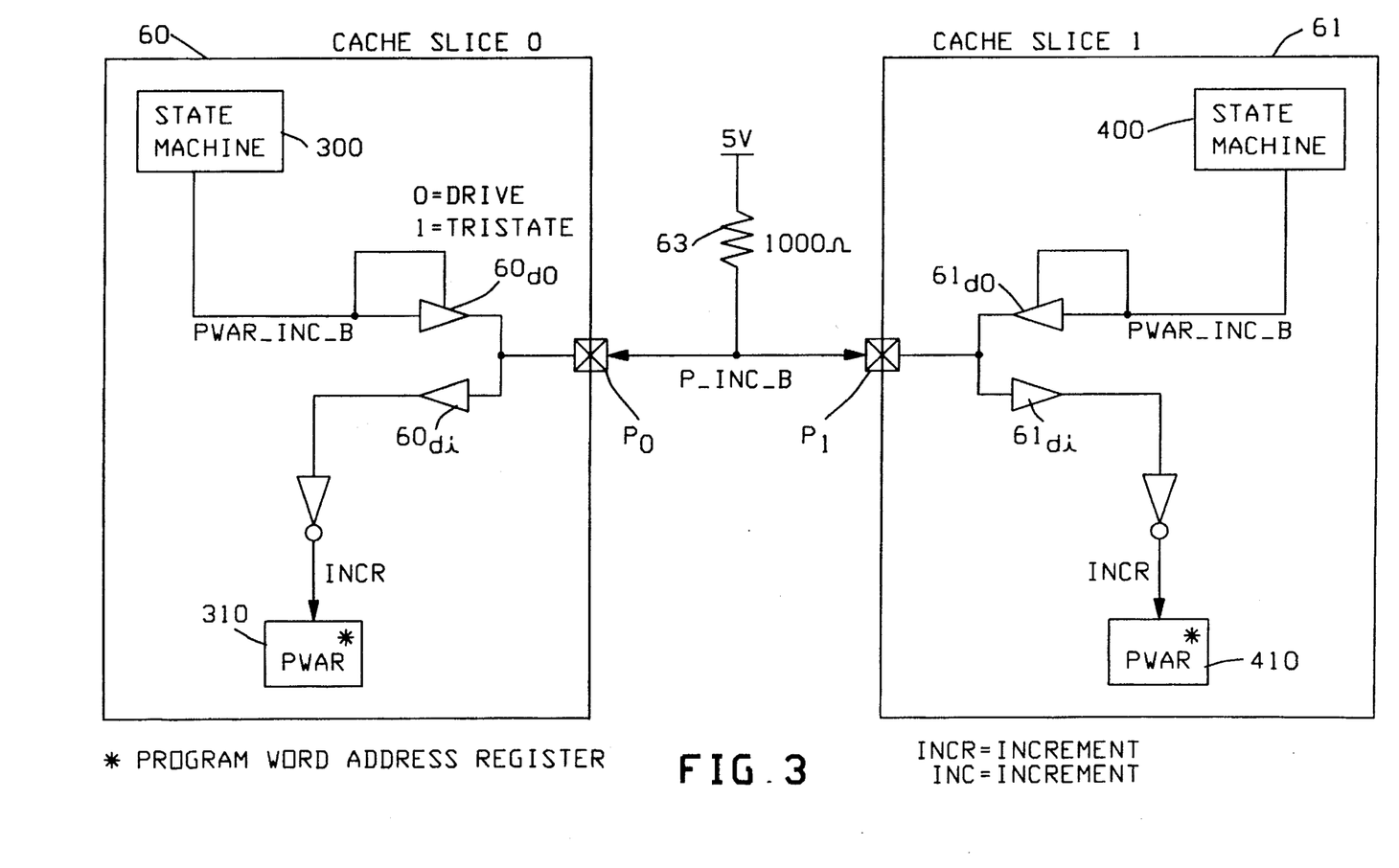
FIG. 3 is a drawing indicating how the intercommunicating signal for incrementation will be tri-stated to prevent each chip module from communicating to the other at the same time.

Thus by making the consideration that minimized pin usage is a higher priority then minimizing the amount of logic used there are certain improvements that can be made in this design. In FIG. 3, the pull up resistor 63 is required because the INCREMENT-B network will be tri-stated most of the time. The pull up resistor 63 prevents the cross exchange signals from floating at a value that might be interpreted from an active signal by either chip 60 or 61. Thus by using a 1000 ohm resistor, for example, pulled up with a power supply voltage of 5 volts, the resistor 63 will sink 5 milliamps of current, with the result that the driving elements must be able to drive enough current to meet the input current specifications of the receiving element and the pull up resistor.

It will be noted in FIG. 2 that two pins ($33_p$, $34_p$ and $43_p$, $44_p$) on each chip array 60, 61, i.e. a total of 4 pins are needed to accomplish the increment function. This can be contrasted with FIG. 3 where only one pin on each chip array (total of 2 pins, $P_0$, $P_1$) perform the increment function, a saving of two I/O pins.

Another concern involved in FIG. 3 is that the length of rise time may occur for too long a period when the driving element is tri-stated, after driving a low active value. Here depending on the capacitance of the net, the inter-communication signal (P_INC_B) may take more than one clock period to be pulled up to a high (inactive) value. Thus it is necessary to make sure that the program word address registers (310, 410) do not get incremented twice if the signal P_INC_B stays active for too long a period.

Figure 4:
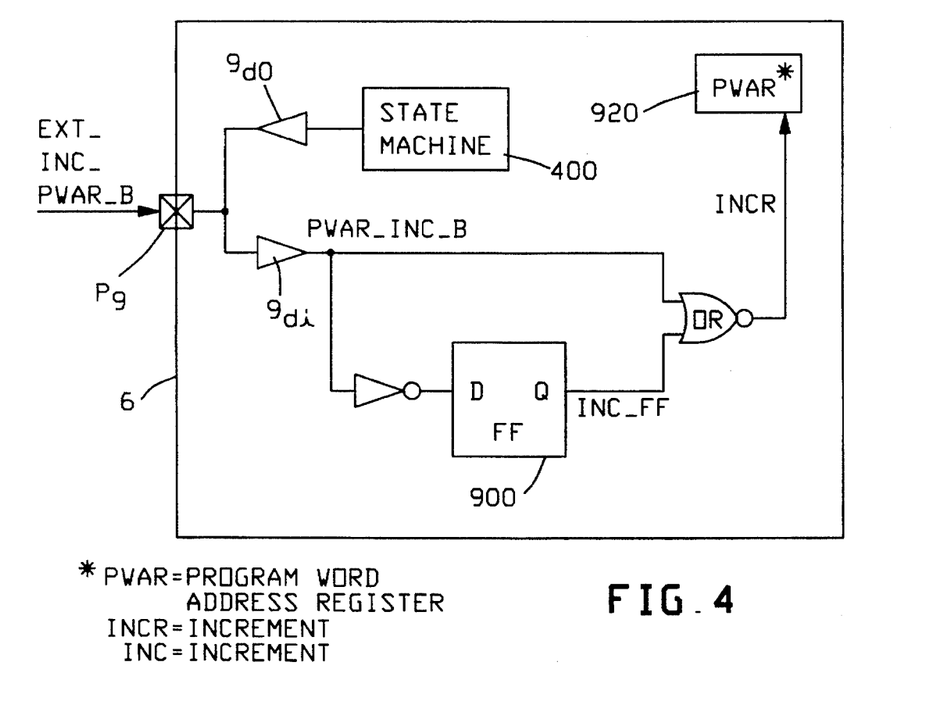
FIG. 4 is a drawing showing additional circuitry for the chip module which will prevent unwanted double incrementation from occurring.
Figure 5:
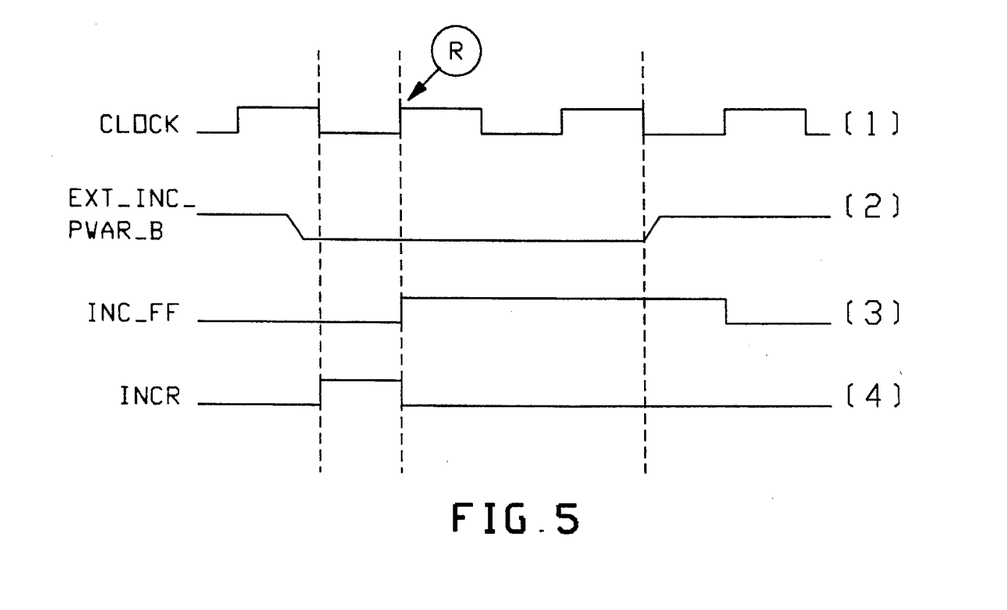
FIG. 5 is a-timing diagram showing how an external incrementation signal to the chip module will provide a proper incrementation to the programmable word address register.

In order to solve this problem, a flip-flop 900 such as seen in FIG. 4 can be used. This will be set to a "1" on the first clock edge after this active signal is detected. At the same time that the flip-flop 900 is being set, the PWAR is also incremented so that the flip-flop will prevent the INCREMENT signal to the PWAR from staying active after the rising edge of the following clock, which prevents a "double count" of the PWAR. In FIG. 4 this is accomplished by the NOR gate 910 and where this action is illustrated in FIG. 5.

FIG. 3 shows a first chip module 60 and a second chip module 61 wherein the module 60 carries the cache slice "0" (even addresses) and the module 61 carries the cache slice "1" (odd addresses).

In the chip module 60, there is seen a programmable word address register PWAR 310 and a state machine 300 plus a set of driver buffers $60_{do}$ and $60_{di}$ which connect to the input/output pin $P_0$. The state machine 300 generates a signal PWAR-INC-B which is conveyed to the buffer $60_{do}$ in order to provide an output signal on the pin $P_0$. This occurs when the signal is "0" (low state=drive). If this signal is a "1", then the buffer driver $60_{do}$ is "tri-stated", that is to say, it is set into a condition of high resistance, thus allowing the pin $P_0$ to accept an input signal which can be fed to the buffer driver $60_{di}$ so that the program word address register (PWAR) 310 can receive an input incrementation signal from the other chip module 61.

Similarly, in the chip module 61, the state machine 400 can provide an incrementation signal PWAR-INC-B which, when "0", will allow the buffer driver $61_{do}$ to drive a signal outward through pin $P_1$ over to pin $P_0$. However, if the state machine output signal is a "1" then the buffer driver $61_{do}$ is "tri-stated" and then the pin $P_1$ will permit an input signal from the chip module 60 to be driven into the buffer driver $61_{di}$ which can provide an incrementation signal to the address register 410. The interconnecting line between pin $P_0$ and $P_1$ is shown having a resistor 63 connected to a 5 volt source to make sure that the value of PWAR_INC_B=1 when neither Slice is driving the net. Since this is an active (low) type signal, the pull-up resistor 63 prevents either chip array from incrementing its PWAR when the net is tri-stated at both ends.

Referring to FIG. 4, there is shown additional circuitry to a typical chip module 6 wherein the incrementation signal to the address register (PWAR) 920 is supplied by an OR gate 910. The OR gate 910 receives a first signal input from buffer driver $9_{di}$ which signal is indicated as PWAR-INC-B and the OR gate 910 receives a second input (INC-FF) from the flip-flop 900 which has a input D and an output Q. The input to D of the flip-flop 900 is sent from the input buffer driver $9_{di}$. The chip 6 has a pin P9 which receives an external signal 930 designated as EXT-INC-PWAR-B which is an externally supplied incrementation signal which is designed to increment the address register (PWAR) 920.

In order to be sure that an address (PWAR) register, does not get incremented twice, if the input signal stays active for too long, certain solutions must be presented to this problem.

To handle this problem, the flip-flop 900 (FIG. 4) is used to set to a "1" on the first clock edge after the active signal is detected. At the same time that the flip-flop 900 is being set, the PWAR 920 is also incremented so that the flip-flop 900 will prevent the incrementation signal INCR to the PWAR from staying active (=high "1") after the rising edge R, FIG. 5 of the following clock, thus preventing a "double count" of the PWAR. This is accomplished with the NOR gate 910.

The timing operation for this logic is shown in FIG. 5. In FIG. 5, it can be seen that when the external incrementation signal goes low, then one-half of one clock later, that is to say on the next rising clock signal, the incrementation flip-flop will go high and thus cut off the incrementation signal on line 4, (FIG. 5) which has just been activated on the second half of the clock signal, line 1 (FIG. 5).

Now with the establishment of the system for mutual incrementation of both address registers, there must be a mechanism to make sure that the two registers contain the same address value. If an inconsistency is detected, the entire cache controller (composed of both cache slices 60 and 61) would need to be "disabled" because of the potential condition for sending incorrect data to the processor.

A process for accomplishing this is to create "2-bits" of parity for each PWAR in chips 60 and 61 and then compare the parity bits of both slices 60 and 61.

For example, using a 26-bit address, the lower 13-bits of the address in the PWAR will generate one parity bit and the upper 13-bits will generate the other parity bit. Thus, by using "odd" parity which will set the parity bit to a "1" if there are "even" number of PWAR address bits set to a 1, and will set the parity bit to a "0" if there are a "odd" number of PWAR bits set to a "1" then a 2-bit parity system can be used. This is accomplished by a tree known as a "exclusive-OR tree" which is shown in FIG. 11.

Figure 11:
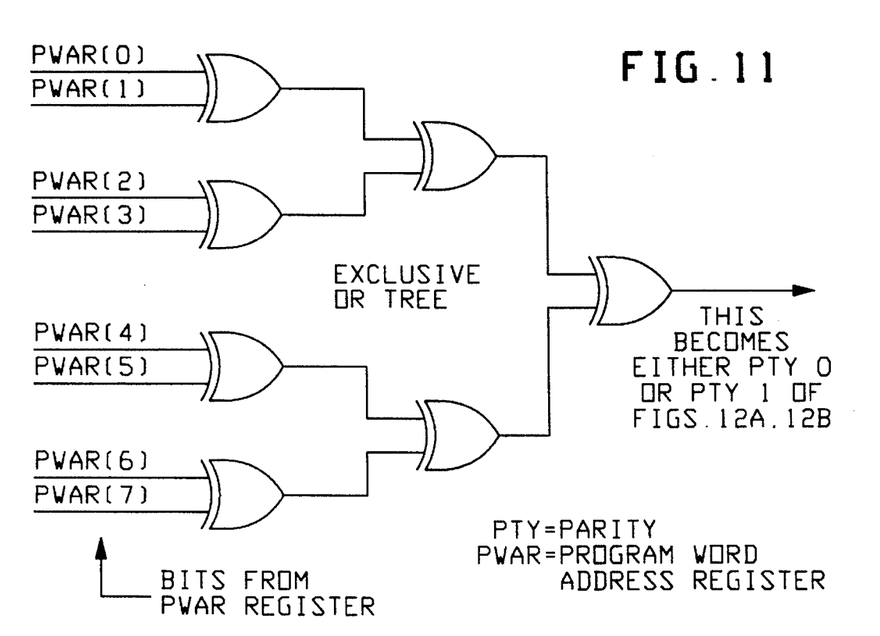
FIG. 11 is a drawing showing a tree circuit used in parity checking for verifying the duplicative value of each of the programmable word array registers.
Figure 12A:
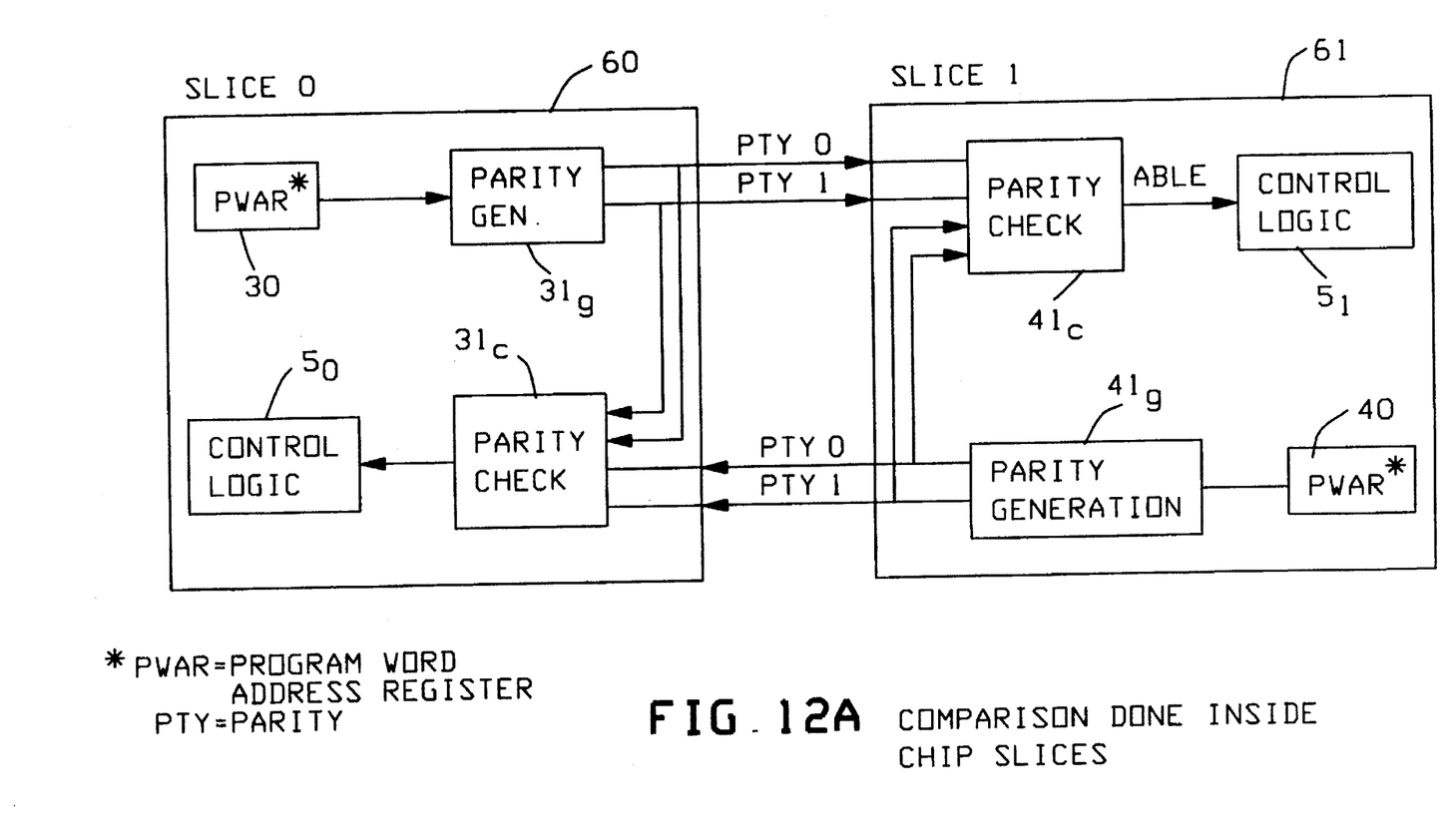
FIG. 12A is a drawing showing how each chip module provides an internal parity check of its own address register with its companion register.
Figure 12B:
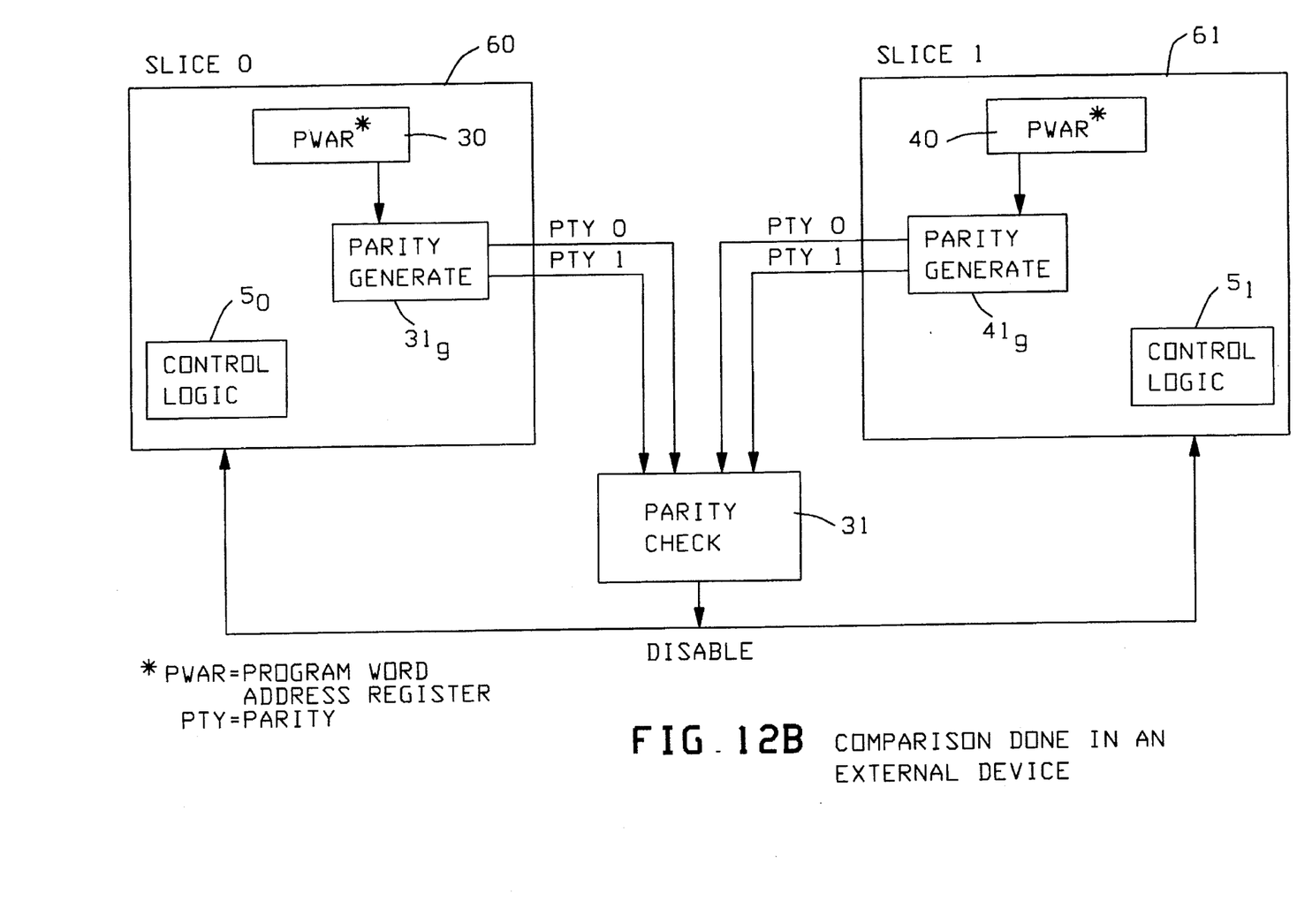
FIG. 12B is a drawing showing how the parity of two separate address registers are checked by an external unit.

FIG. 11 shows, for example, a series of inputs from each individual bit in a program word address register (PWAR) being fed to the parity tree where the final exclusive OR gate will develop the parity value output signal shown in FIGS. 12A and 12B (PTYØ, PTY1).

Now regarding FIG. 11, which indicates the exclusive-OR parity tree, the two PWAR parity bits from each individual cache slice 60 or 61 can either be sent directly to the other slice thus requiring four I/O pins, per cache slice (FIG. 12A) that is to say two outputs and two inputs where identical logic in each individual cache slice will compare the parity bits involved and generate a signal to "disable" itself if an error occurs. On the other hand, the parity bits can be sent to some external logic device such as a PAL (programmable array logic unit) that can perform the comparison and send a signal telling both cache slices to "disable" themselves. The second alternative requires only four I/O pins on each cache slice device but then, requires the use of an additional chip. FIGS. 12A and 12B are examples of how respectively, the parity comparison can be done inside the chip slices while FIG. 12B indicates how the comparison can be done via an external device.

In the case shown in FIG. 12A where the parity comparison is done "inside" each of the chip slices, 60, 61, it will be seen that in the chip module 60, the address register (PWAR) 30 feeds its information to the parity generator $31_g$ which provides a signal of parity "0" or parity "1" to the parity checker $41_c$ in module 61. If the parity checker discovers an inconsistency then a disable signal is provided to the control logic $5_1$.

Likewise, in the cache slice #1 of module 61, the address register (PWAR) 40 provides its address bits to the parity generator $41_g$, which outputs a parity "0" signal (or a parity "1" signal) over to the parity checker $31_c$ of the module 60. A checking comparison, if inconsistent, will cause a "disable signal" to the control logic $5_0$. Thus if there is an inconsistency between the addresses in the address register (PWAR) 30 and the address register (PWAR) 40 then the information in each of these address registers will be unusable because the control logic in each of the slices has been disabled.

Similarly, the parity comparison operation can also be done in an external device such as the parity checker 31 of FIG. 12B. Here the first chip module 60 for slice "0" is seen having control logic $5_0$, an address register 30 which feeds its address to the parity generator $31_g$. The parity generator $31_g$ provides either a "0" or a "1" of two parity signals to the parity checker 31.

Likewise in the chip module 61 which carries the slice "1", there is seen the control logic $5_1$ and the address register 40 which feeds its address digits to the parity generator $41_g$. The parity generator $41_g$ will feed either a "0" or a "1" of two parity signals to the parity checker 31.

If and when the parity checker 31 finds an inconsistency in the parity signals which it receives between the two slices 60 and 61, then the parity checker will provide a disable signal to both of the control logic units $5_0$ and $5_1$.

Disclosed herein has been architecture and methods of synchronizing two registers in two separate but identical devices. By choosing the most appropriate method in any given situation, large cost savings can be realized due to several factors:

(a) Since pin limitations are often a serious problem in VLSI chips, then by reducing the number of pins in a chip, it is possible to either reduce the number of chips needed to perform a function or it is possible to utilize smaller less expensive chips.

(b) Similarly if a processor and cache design operation is being implemented in programmable array logic (PALs), then it is possible that much reduced logic circuitry can result thus requiring less chips or even smaller chips. The same holds true also for VLSI chips.

The present architectural systems and method permit a faster and more reliable relationship between a processor and its cache and also permit the operation of odd and even address cache situations which can be operated in parallel in order to speed throughput.

Thus by providing for synchronized loading and coherent integrity of comparable registers in different chips, it is possible to very efficiently and inexpensively speed and enhance the function of processor operations and throughput.

While the above described implementations of the system for loading synchronization and integrity between comparable registers has been provided, it should be understood that the concept and process of the invention may be implemented in other forms and are to be defined by the following claims.

What is claimed is:

1. In a cache memory having a first cache unit chip holding a first program word address register for receiving even addresses, and a second cache unit chip holding a second program word address register for receiving odd addresses, a system for insuring that the even address residing in said first program word address register is coherent with the odd address residing in said second program word address register at all time periods of operation, said system comprising:

(a) said first cache unit chip including:
(a1) a first data memory holding a first group of data words having even addresses;
(a2) a first tag memory holding a group of even addresses corresponding to said first group of data words;
(a3) first cache controller means for addressing said first tag memory;
(a4) said first program word address register for holding the next even address of the program word to be executed;

(b) said second cache unit chip including:
(b1) a second data memory holding a second group of data words having odd addresses;
(b2) a second tag memory holding a group of odd addresses corresponding to said second group of data words;
(b3) second cache controller means for addressing said second tag memory;
(b4) said second program address word register for holding the next odd address of the program word to be executed;

(c) intercommunication means between said first and second cache unit chip to simultaneously maintain coherency of address content, at all time periods, between said first and second program address word registers.

2. The system of claim 1 wherein said intercommunication means includes:

(a) first and second state machine means respectively in said first and second cache unit for incrementing said respective first and second program word address registers after executing access to a fetched word;
(b) a first set of input/output pins on said first cache unit;
(c) a second set of input/output pins on said second cache unit;
(d) interconnection means between said first and second set of input/output pins to enable simultaneous incrementation of said first and second program word address registers.

3. The system of claim 1 which includes:

(a) means to load a program word address into said first and second program word address registers at the same moment in time.

4. The system of claim 1 which includes:

(a) means to increment either one of said first and second program word address registers;
(b) means to cause the simultaneous incrementation of said second program word address register when said first program word address register is incremented, to maintain address coherency;
(c) means to cause the simultaneous incrementation of said first program word address register when said second program word address register is incremented, to maintain address coherency.

5. A cache memory system working with an associated processor and using first and second replicative modules for respectively storing even addresses for correspondingly stored words therein and odd addresses for correspondingly stored words therein comprising:

(a) first and second sets of programmable input/output pins for enabling intercommunicating signals between said first and second module, said intercommunicating signals enabling an address incrementation signal in said first module to be synchronously applied to said second module and enabling said address incrementation signal in said second module to be synchronously applied to said first module;

(b) wherein each one of said first and second modules includes:

(b1) a program word address register holding the address of a word requested by said associated processor;

(b2) a state machine for simultaneously incrementing said program word address register;

(b3) means to synchronously increment the other program word address register which was not addressed by said associated processor;

(c) said associated processor for alternately requesting odd and even addresses in said first and second module to retrieve a specified program word.

* * * * *